No. 752,698. PATENTED FEB. 23, 1904.
F. L. McCULLOCH.
NUT LOCK.
APPLICATION FILED JULY 1, 1903.
NO MODEL.

Witnesses
Geo. H. Byrne
Fred W. Englert

Inventor
F. L. McCulloch
By Wilkinson + Fisher
Attorneys

THE NORRIS PETERS CO., PHOTO-LITHO., WASHINGTON, D. C.

No. 752,698. Patented February 23, 1904.

UNITED STATES PATENT OFFICE.

FREDRICK L. McCULLOCH, OF TAMPA, FLORIDA.

NUT-LOCK.

SPECIFICATION forming part of Letters Patent No. 752,698, dated February 23, 1904.

Application filed July 1, 1903. Serial No. 163,923. (No model.)

*To all whom it may concern:*

Be it known that I, FREDRICK L. McCULLOCH, a citizen of the United States, residing at Tampa, in the county of Hillsboro and State of Florida, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks; and the object of my invention is to produce a simple and inexpensive nut-lock and one that may readily be used even by an inexperienced laborer.

With these objects in view my invention consists in the construction and combinations of parts, as hereinafter described and claimed.

Figure 1:
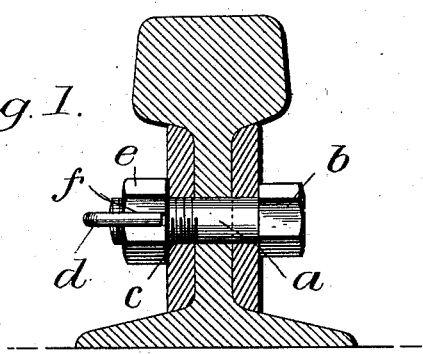
Figure 2:
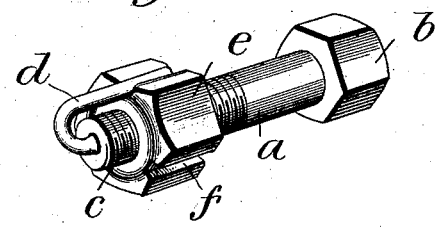
Figure 3:
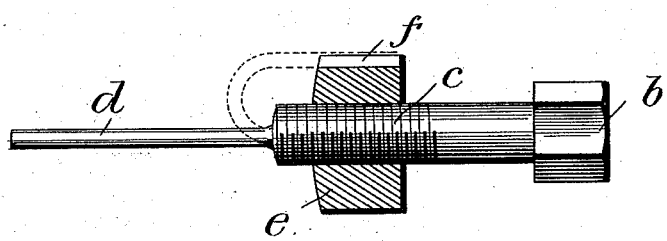
Figure 4:
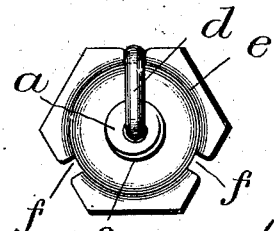

In the accompanying drawings, Figure 1 represents a railroad-rail and fish-plates in cross-section with my invention applied thereto. Fig. 2 is a perspective view of my improved nut-lock. Fig. 3 is a side view of the same, partly in section, showing in dotted lines the position which the locking-pin assumes when the nut is locked; and Fig. 4 is an end view of my invention.

$a$ represents a bolt provided with the usual hexagonal head $b$ and screw-threaded portion $c$. Extending outwardly from the center of the screw-threaded portion is the locking-pin $d$, preferably made cylindrical, although not necessarily. This locking-pin is made integral with the bolt, the whole being stamped out at one operation. $e$ represents the nut, preferably hexagonal in shape. In three of the faces of this hexagonal bolt are cut mortises or grooves parallel to the axis of the nut. The nut also may be made in one piece by stamping. The nut, of course, is screw-threaded on the inside to engage with the screw-threaded portion $c$ of the bolt.

In using my invention the bolt is slipped through the holes in the fish-plates and rail and the nut applied thereto and turned until it firmly holds said fish-plates and rails together. The locking-pin $d$ is then bent over into one of the grooves $f$ in the nut $e$, holding it firmly in position.

It always happens in case of these securing-bolts that they have to be tightened from time to time, and in case of my invention this can readily be done by bending back the pin $d$ slightly, tightening up the nut $e$, and then bending back the pin to engage with one of the grooves $f$.

One important feature of my invention is that owing to the central position of the locking-pin with relation to the bolt said pin can be readily, easily, and quickly bent over to engage any one of the grooves $f$, no matter what the position of the nut is. In practice this is found to be very valuable, because these bolts are applied and locked by unskilled laborers, and unless the pin can be bent into position easily the locking of the nut would probably be neglected altogether.

My invention can be applied equally well whether the nut is at its extreme outward position upon the bolt or whether it is screwed into its extreme inward position or any position between these two.

While I have described my invention as applied to railroad-rails, it is not limited to this use solely. It can be used in marine work or, in fact, in any work in which the vibration has a tendency to loosen the nut.

Having thus described my invention, what I claim as new, and desire to secure by Letters Patent of the United States, is—

A lock-nut comprising a polygonal nut provided with internal screw-threads and with grooves on the faces of said nut, said grooves extending the full length of said faces and parallel to the axis of said nut, and a bolt provided with the ordinary head and screw-threads and with a cylindrical locking-pin extending from the center of the screw-threaded end thereof and adapted to be bent in any direction to engage the grooves of the nut and thereby form a universal lock, substantially as described.

In testimony whereof I affix my signature in presence of two witnesses.

FREDRICK L. McCULLOCH.

Witnesses:
FRED W. ENGLERT,
FRANK D. BLACKISTONE.